United States Patent [19]

Meacham

[11] Patent Number: 5,016,047
[45] Date of Patent: May 14, 1991

[54] LIGHT-MODIFYING APPARATUS FOR EXPOSURE DEVICES

[75] Inventor: G. B. Kirby Meacham, Shaker Heights, Ohio

[73] Assignee: nuArc Company, Inc., Niles, Ill.

[21] Appl. No.: 548,087

[22] Filed: Jul. 5, 1990

[51] Int. Cl.⁵ .................................... G03B 27/72
[52] U.S. Cl. ................................ 355/71; 355/93
[58] Field of Search .................. 355/35, 36, 71, 80, 355/121, 124, 125, 93

[56] References Cited

U.S. PATENT DOCUMENTS

| | | | |
|---|---|---|---|
| 3,677,633 | 7/1972 | Huber | 355/235 |
| 3,738,748 | 6/1973 | Weihsmantel et al. | 355/93 X |
| 4,090,786 | 5/1978 | Bobbe | 355/71 X |
| 4,240,743 | 12/1980 | Hilboki et al. | 355/93 X |
| 4,536,085 | 8/1985 | Hilboki et al. | 355/93 |
| 4,600,666 | 7/1986 | Zink | 355/125 X |
| 4,636,064 | 1/1987 | Penza | 355/73 |
| 4,801,969 | 1/1989 | Hamidian | 355/71 X |

FOREIGN PATENT DOCUMENTS 236651  7/1925  United Kingdom .................. 355/93

Primary Examiner—L. T. Hix
Assistant Examiner—D. Rutledge
Attorney, Agent, or Firm—Mason, Kolehmainen, Rathburn & Wyss

[57] ABSTRACT

A light-modifier for changing the character of light flowing from a light source towards an image forming sheet and a sheet of light sensitive copy in an exposure device includes a roll of thin, flexible light-modifying plastic sheet material which is rotatably mounted for rolling and unrolling on a roller to extend between a first light-intercepting unrolled position extending outwardly between said image forming and copy sheets on the one hand and said light source on the other hand and a second, rolled-up position offset from the copy sheet. The apparatus may be made for sale as an accessory or optional item for a wide variety of existing exposure devices whenever it is desired to change the character or form of the light energy by diffusion, filtering or attenuation, and the apparatus may be directly incorporated as an integral part of a new exposure device.

22 Claims, 5 Drawing Sheets

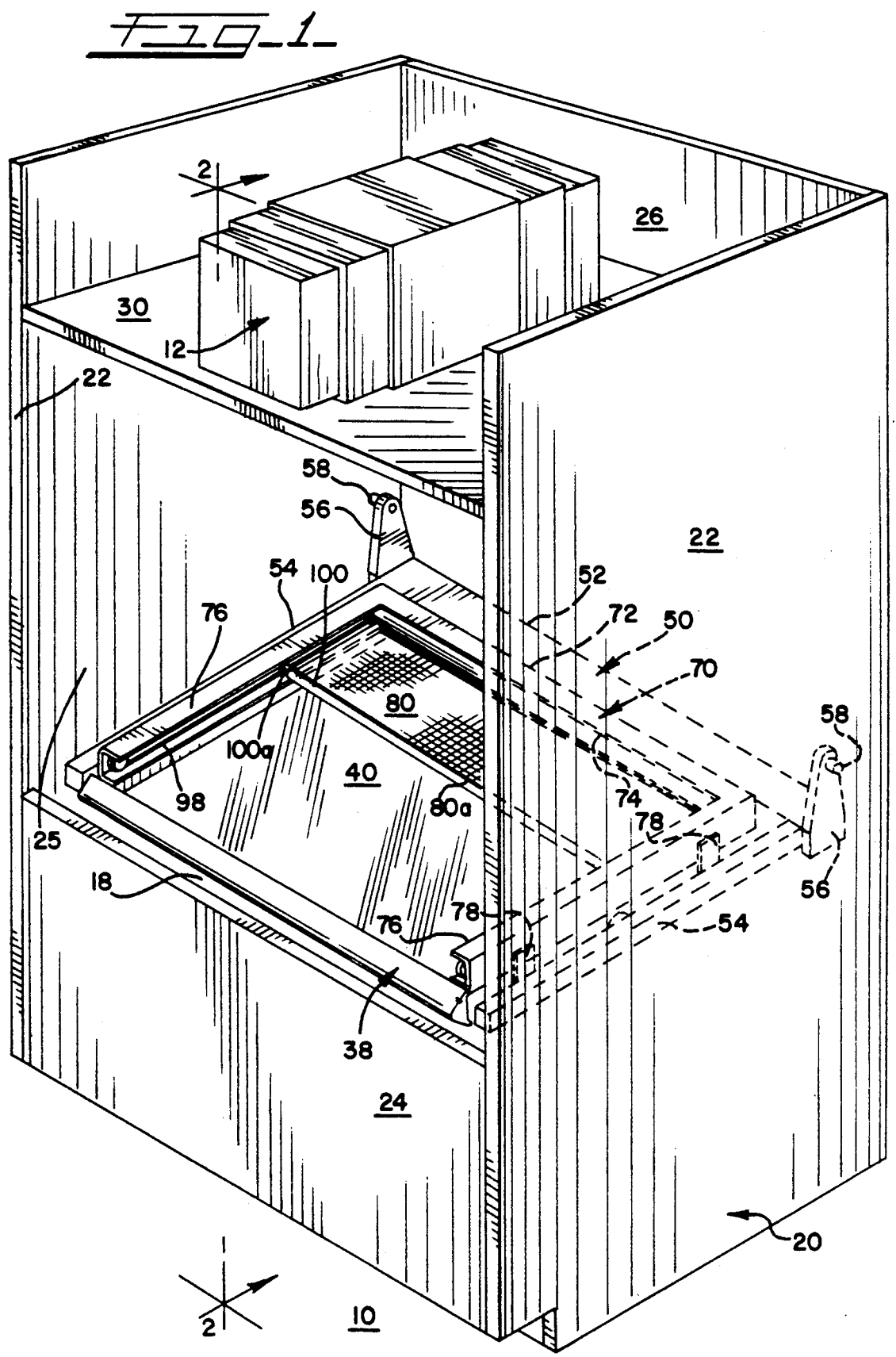

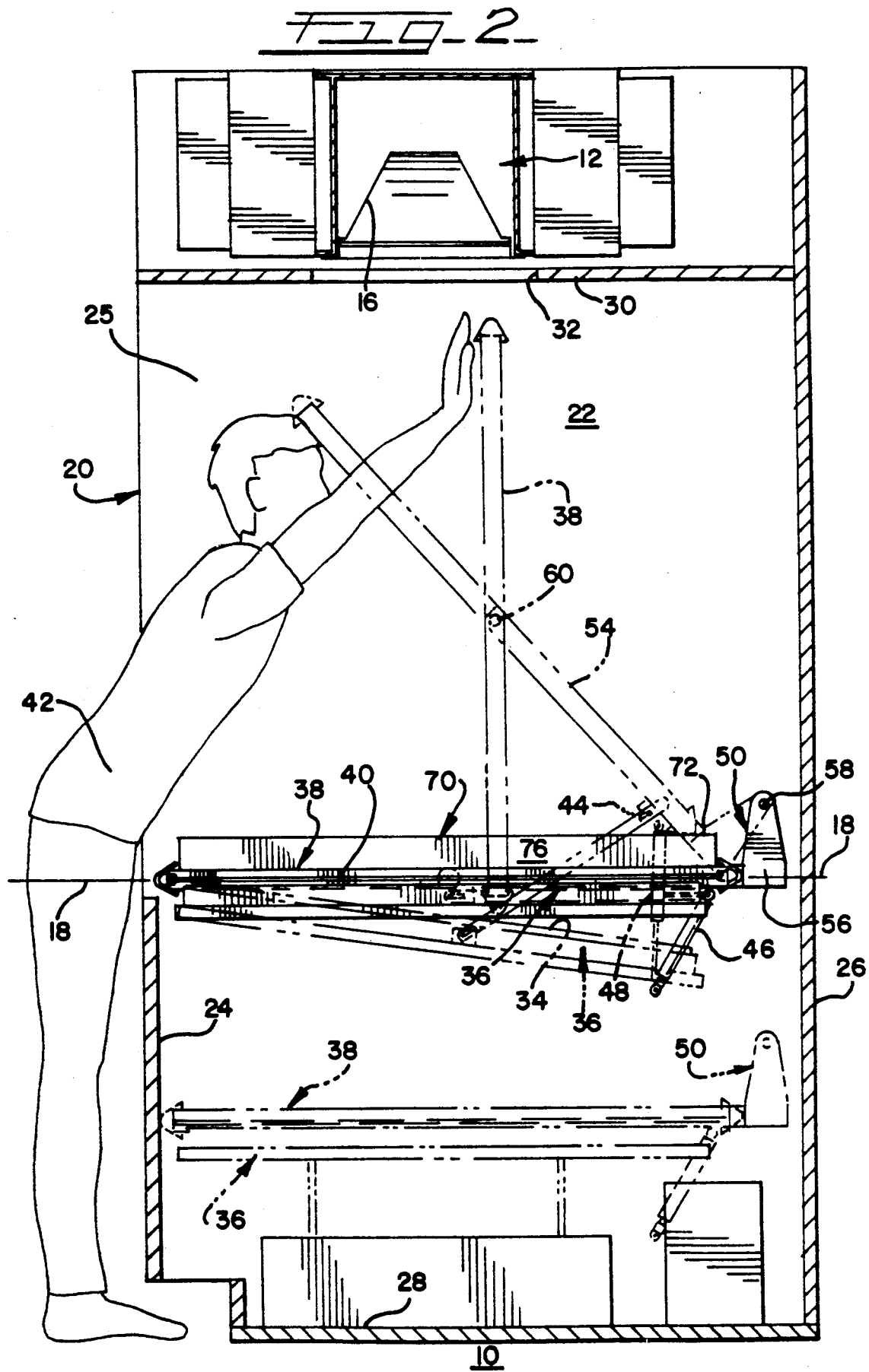

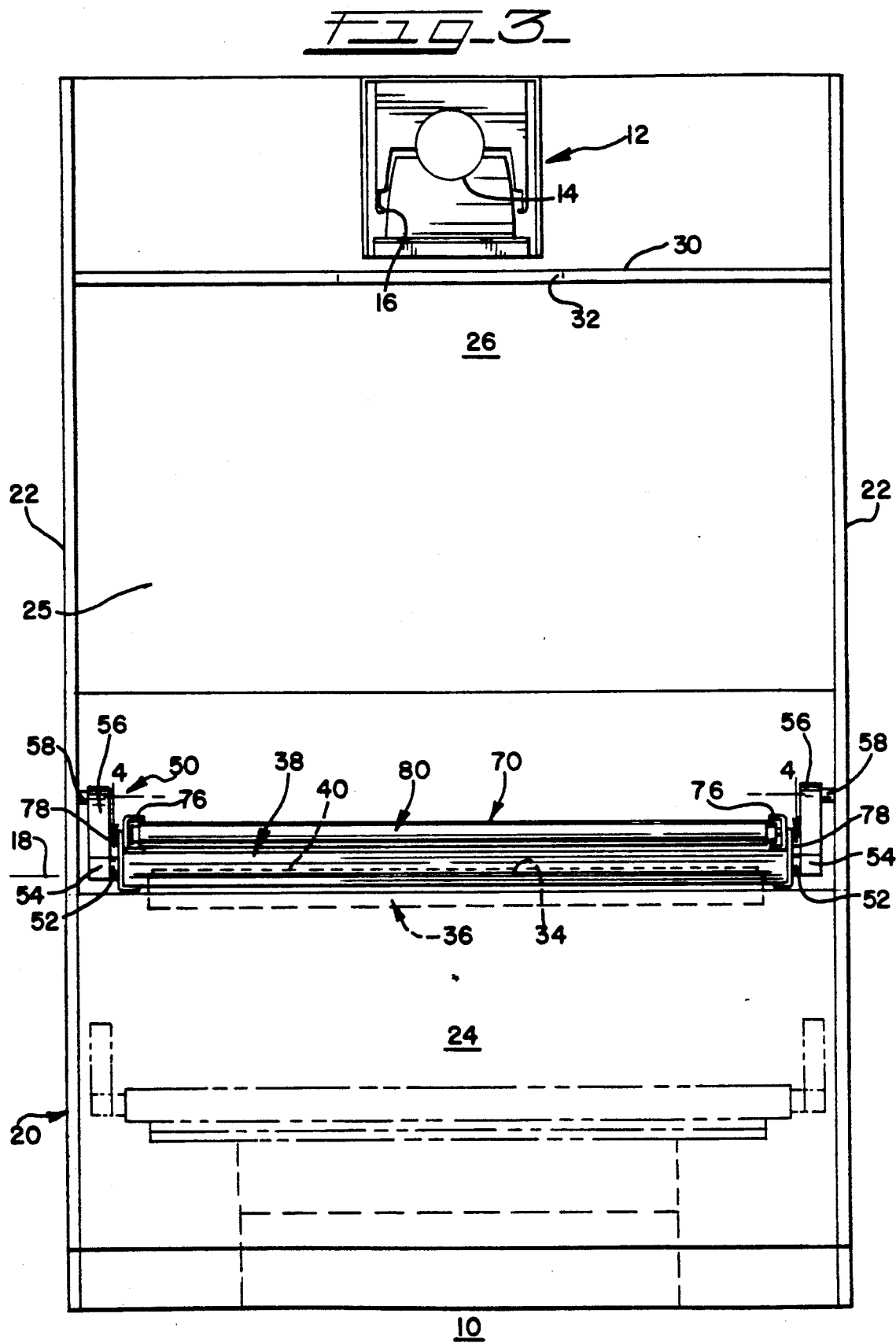

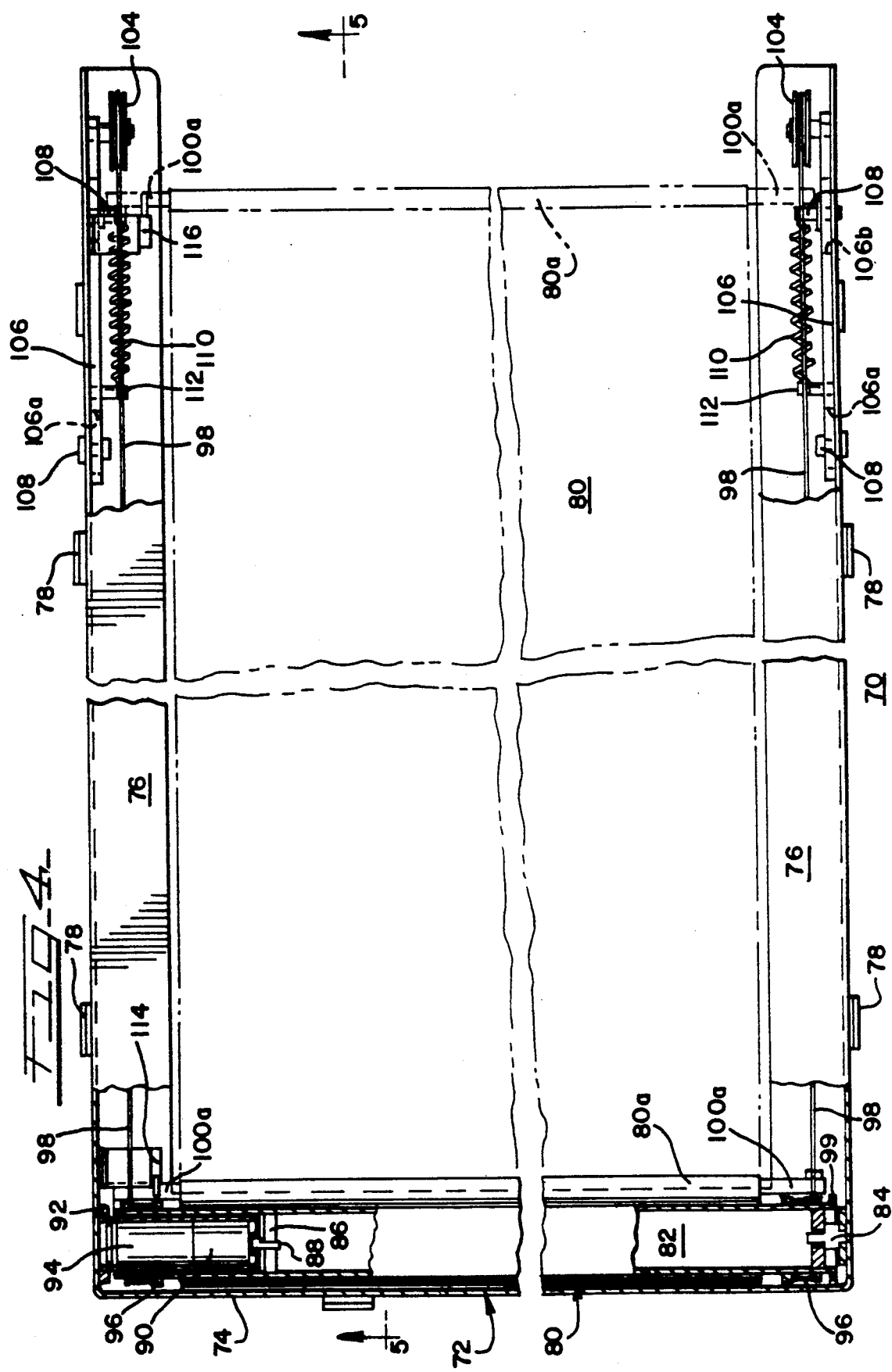

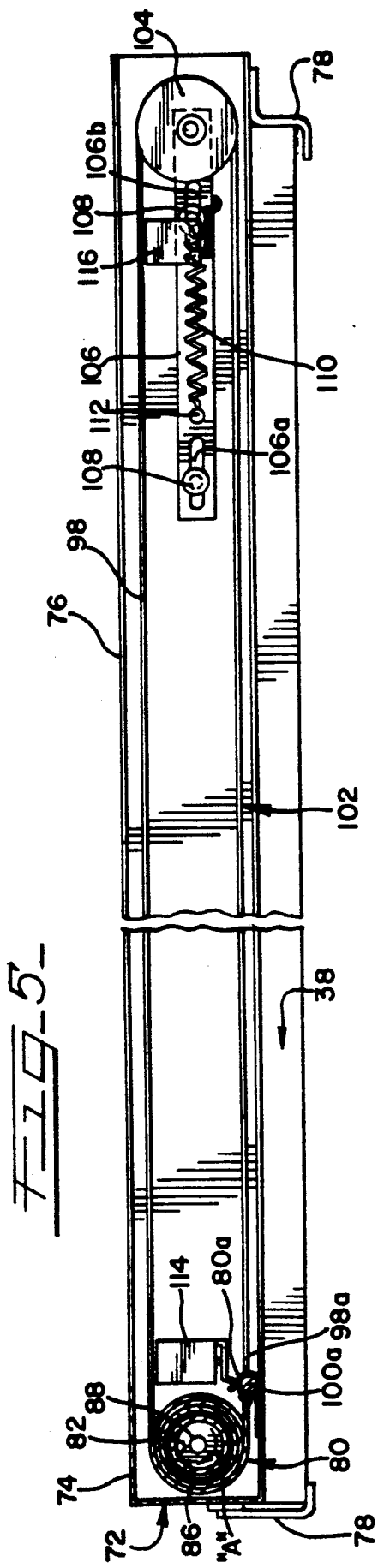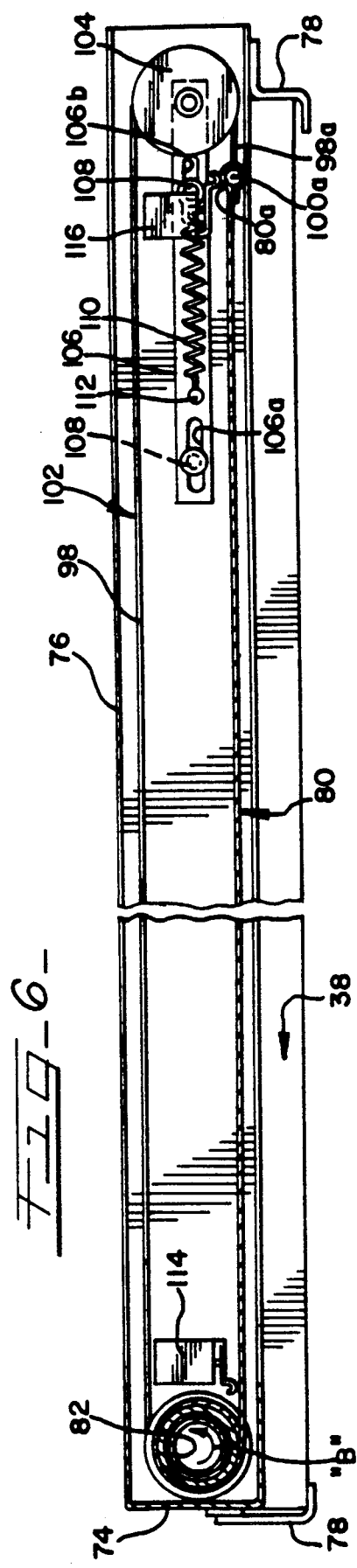

LIGHT-MODIFYING APPARATUS FOR EXPOSURE DEVICES

BACKGROUND OF THE INVENTION

1. Field of the Invention

The present invention relates to a new and improved light-modifying apparatus for use with light exposure devices such as copiers, contact printers and the like, etc. used in the graphic arts industries. Oftentimes, it is desirable to change the character of the light passing through an image sheet toward a light sensitive copy sheet. For example, collimated light may be changed to diffused light so that "spreads" and "chokes" may be used to provide small dimensional changes of characters on an image sheet. Prints reproduced with diffused light may vary considerably from prints made with ordinary collimated light and, in addition, the present invention is useful to provide a filtering action for filtering out an unwanted portion of the spectrum of light or for attenuating light energy in certain wavelengths when using particular types of light sensitive copy sheets or image sheets of either a positive or a negative type.

2. Background of the Prior Art

One of the problems associated with exposure devices is the problem caused by dust and other particles often present on image sheets, copy sheets and rigid transparent sheet materials used in such exposure devices. Such accumulations of dust and other particles cause "pinholes" to be present in a printed copy and for this reason, diffused light rather than collimated light is often desired to minimize the presence of such pinholes. It is also desirable to provide a sheet of light diffusing media spaced between the source of light and a positive or negative image sheet and a light sensitive copy sheet which are contained between a rigid, transparent sheet of glass or plastic material and a vacuum blanket for holding the sheets in precise registration. A wide variety of flexible plastic films have been developed for modifying the character of light energy including drafting films made of plastic resins sold under the trade name "Mylar" which may have a frosted surface on one face for diffusing the light and thereby enabling techniques such as "spreads" and "chokes" to be practiced for changing the dimensional characters of the images that are reproduced. It is also desirable to provide a flexible film for a light filter positioned between the light source and light sensitive copy and image forming sheets so that the colors reproduced may be modified or changed from a wide spectrum to a relatively small spectrum of the wavelength of available light energy.

Yet another need encountered in exposure devices of the character described is to provide an attenuating filter of film media positioned between a light source and a light sensitive copy and image sheets which is able to hold back a certain amount of the light otherwise present for producing a precision controlled exposure of the light sensitive medium.

OBJECTS OF THE INVENTION

It is an object of the invention to provide a new and improved light-modifying apparatus for exposure devices which is capable of providing diffusion of light energy, filtering of light energy and attenuating the light energy for exposing light sensitive films through an image media in contact therewith.

Another object of the present invention is to provide a new and improved apparatus of the character described which can be readily assembled onto existing exposure devices and which can be operated to move between operative or inoperative conditions as desired.

Yet another object of the present invention is to provide a new and improved light-modifying apparatus of the character described which is useful with both positive and negative types of image sheets and the light sensitive copy sheets used therewith.

BRIEF SUMMARY OF THE PRESENT INVENTION

The foregoing and other objects and advantages of the present invention are accomplished in a new and improved light-modifying apparatus for exposure devices for changing the character of light energy flowing from a light source toward a generally planar image sheet and sheet of light sensitive copy. The apparatus includes a yoke or U-shaped member having a bight portion mounted adjacent one edge and outside of a generally rectangular image forming sheet and which are supported on a transparent plate of a glass frame by an adjacent vacuum blanket. The yoke includes a pair of legs extending normally outwardly from opposite ends of the bight along opposite sides of the copy sheet. A roll of thin, flexible, light-modifying sheet material such as "Mylar" plastic film is rotatably mounted parallel of the bight for rolling and unrolling on a supportive hollow roller between a first, light-intercepting, unrolled position extending outwardly from the bight between the legs of the yoke and generally parallel of the planar images and copy sheet and a second, rolled-up position offset therefrom. The light-modifying sheet material is spaced between the light source and the copy and image sheets so as to modify the light when the flexible sheet material is unrolled to provide one or more light-modifying functions such as diffusion, attenuation or filtering.

A guide system including a cable assembly is provided on each of the legs of the yoke and is interconnected to a rod attached to a leading edge of the roll of light-modifying sheet material for moving the edge of sheet material toward and away from the roller and maintaining tension thereon. Each cable secured to an end portion of the rod and is entrained over an idler pulley and wound on a drive drum in coaxial alignment on the roller. The roller is driven to rotate in opposite directions by a motor mounted within the roller body and has a stator secured to the yoke to unroll and roll the sheet material on the roller when the motor is energized. Limit switches are provided for deenergizing the motor when the sheet material reaches prescribed unrolled or rolled-up positions..

BRIEF DESCRIPTION OF THE DRAWINGS

These and other objects and advantages of the present invention will become readily apparent upon consideration of the following detailed description and attached drawing, wherein:

FIG. 1 is a front perspective view of a light-modifying apparatus in accordance with the features of the present invention and shown as installed with a light exposure device;

FIG. 2 is a transverse cross sectional view of the apparatus and device taken substantially along lines 2—2 of FIG. 1;

FIG. 3 is a front elevational view of the apparatus;

FIG. 4 is an enlarged horizontal cross-sectional view of the apparatus taken substantially along lines 4—4 of FIG. 3;

FIG. 5 is an enlarged transverse cross-sectional view of the apparatus taken substantially along lines 5—5 of FIG. 4, showing the light-modifying sheet material in a rolled-up condition; and FIG. 6 is an enlarged cross-sectional view similar to FIG. 5, but illustrating the light-modifying sheet material in an unrolled position for filtering, diffusing and/or attenuating light passing from a light source to a light sensitive copy and image forming sheet on the exposure device.

DETAILED DESCRIPTION OF A PREFERRED EMBODIMENT OF THE INVENTION

Referring now more particularly to the drawings, therein is illustrated a light exposure device 10 used for contact printing and photographic reproduction in the graphic arts industry. The exposure device 10 includes an overhead light assembly 12 including a light source 14 and reflector 16 (FIG. 3) for directing controlled intensity light downwardly towards a horizontal working surface at approximately waist-high level as generally indicated by the reference numeral 18.

The exposure device 10 has an upstanding cabinet 20 having a pair of vertically extending, opposite side walls 22, a lower front wall 24, a back wall 26, a bottom wall 28 and an upper shelf 30 having a large rectangular opening 32 defined therein for accommodating the passage of light downwardly from the overhead lamp 14 towards the working level 18.

Typically, a working surface for the exposure device 10 is defined on an upper face 34 of a vacuum blanket assembly 36 positioned below a glass frame assembly 38 supporting a rigid, transparent panel of glass or plastic material 40. An image forming sheet and a sheet of light sensitive material are biased in close registration against the panel 40 by the action of the vacuum blanket 34. The vacuum blanket may be of the type shown and disclosed in copending U.S. patent application Ser. No. 07/369,334, filed June 21, 1989 and incorporated herein by reference, which copending patent application is assigned to the same assignee as the present application.

During operation of the exposure device 10, an operator 42 usually works while in a standing position directly in front of the front wall 24 of the cabinet 20 and has access to an open space 25 within the cabinet below the upper shelf 30 and above the generally horizontal working surface 18 as best illustrated in FIG. 2. The glass frame 38 and vacuum blanket assembly 36 are functionally interconnected for operation by means of a pair of linkage levers 44 and air springs 46 and 48 are utilized for holding the glass frame and its support in an upwardly pivoted position as shown in FIG. 2 while at the same time a rearward portion of the vacuum blanket assembly 36 is pivoted downwardly as illustrated to separate the vacuum blanket 34 and the glass panel 40 for loading and unloading the image and copy sheets used between the transparent panel 40 and the upper surface of the vacuum blanket 34.

As more fully described in another copending U.S. patent application Ser. No. 07548,088, filed July 5, 1990, which application is incorporated herein by reference and also assigned to the same assignee as the present application, the glass frame 38 is mounted on a U-shaped yoke assembly 50 having a central bight portion 52 parallel of the cabinet back wall 26 and extending between opposite inside surfaces of the side walls 22. The bight 52 is provided with a pair of side legs 54 extending normally outwardly thereof from opposite ends. The yoke 50 is supported on a pair of brackets 56, which brackets are in turn mounted on pivot axles 58 extending inwardly from opposite inner faces of the cabinet side walls 22. As illustrated in FIG. 2 and as described in more detail in the last-mentioned copending U.S. patent application (NU-64), the glass frame 38 is mounted for pivotal movement relative to the side legs 54 of the yoke assembly 50 about pivot axles 60 located at midpoints along the legs to afford 360° pivotal movement of the glass frame 38 for better cleaning and inspection as illustrated in FIG. 2.

In accordance with the present invention, a new and improved, light-modifying apparatus 70 for use in or with the exposure device 10 and with other already existing light exposure devices includes a U-shaped, yoke assembly 72 formed of elongated metal channel members comprising a central bight 74 and a pair of opposite side legs 76 extending outwardly and perpendicularly from opposite ends of the bight as best shown in FIGS. 1, 5 and 6. As illustrated in FIGS. 1 and 4, the yoke assembly 72 is open at a forward end and may be dimensioned to rest upon the main yoke assembly 50 that supports the pivotal glass frame 38. If desired, the yoke 72 is dimensioned to be fastened directly to the glass frame 38 so as to move therewith as illustrated, in which case, suitable clips 78 are provided on the legs 76 and bight 74 to secure the yoke and glass frame together to move in unison.

The channel-shaped bight 74 and legs 76 are arranged with open sides of the channels facing inwardly towards a central space or region defined directly above the vacuum blanket assembly 36 so that the light-modifying assembly 70 is in position to receive and modify the light generated from the overhead lamp or light source 14 and directed downwardly towards the light sensitive copy sheet and image sheets held between the transparent rigid plate 40 in the glass frame 38 and the vacuum blanket 34 when the members are in a horizontal operating position as shown in FIGS. 1 and 3.

In accordance with the present invention, the light-modifying apparatus 70 includes a roll of thin, flexible plastic sheet material 80 used for modifying the characteristics of the light provided from the source 14 for exposing light sensitive copy sheets in the exposure apparatus 10. The light-modified flexible sheet material 80 may comprise a resinous film of transparent plastic material such as "Mylar" film of approximately 4 mils. in thickness and having an upper surface that is frosted for the purpose of diffusing the light striking the same as it moves downwardly through the sheet material and the transparent plate 40 to expose the copy sheet on the vacuum blanket 34.

Other types of light-modified sheet materials such as polarized sheets, filter sheets adapted to screen or filter out certain wavelengths or sections of the light spectrum may also be utilized as desired. Similarly, a sheet material of a particular color shade or tint may be provided to attenuate certain portions of the spectrum of light energy generated by the light source 14 is to be diminished or eliminated.

In any event, a roll of sheet material 80 is supported on an elongated, hollow roller 82 which, in turn, is mounted for rotation and contained within a housing formed by the bight 74 of the yoke assembly 72 as best shown in FIGS. 4, 5 and 6. As viewed in FIG. 4, one end of the hollow roller 82 is supported on a bearing assembly 84 secured to an end wall of the bight 74 and the other end of the roller 82 is supported on a circular internally mounted drive disk 86 mounted on a rotor shaft 88 driven by the rotor of an electric drive motor 90 in coaxial alignment within the roller 82. The electric motor is supported on a base 92 fixedly attached to an end wall of the bight 74. The base 92 supports a stator section 94 of the motor 90 contained within the hollow interior of the roller 92.

The electric motor 90 is a reversible type motor which will drive the coaxial roller 82 to rotate in opposite directions and when the motor is energized with the proper polarity of electrical power. The roller 82 is enclosed within the walls of the bight 74 and is rotated in a clockwise direction as indicated by the arrow "A" in FIG. 5 for withdrawing the sheet of light-modifying material 80 toward a rolled-up position on the roller 82 or may rotate in a counterclockwise direction as indicated by the arrow "B" in FIG. 6 for unrolling the light-modifying sheet material 80 to extend outwardly from the roller 82 in parallel relation to the transparent plate 40 of the glass frame 38.

A brake mechanism 99 (FIG. 4) is engageable with the roller 82 to prevent unpowered rotation caused by gravity when the yoke 70 is moved out of a horizontal position. The brake 99 may be a constant drag brake or a power off, spring apply solenoid operated brake.

On opposite outer end portions of the roller 82, there is mounted a drive pulley or drum 96 rotatable with the roller and adapted to contain several loops of a flexible metal cable 98 having an outer end 98a attached to an end portion of a tension rod 100. The tension rod 100 is aligned parallel of the bight 74 to extend transversely between the side legs 76 and passes through a pocket 80a formed in a leading edge of the light-modifying, flexible sheet material 80.

As illustrated in FIGS. 4, 5 and 6, the body of sheet material 80 is under continuous tension by virtue of the elongated rod 100 at the free leading edge and the supporting roller 82 at the inner edge of the sheet material. Opposite end portions 100a of the rod 100 and opposite edges of the sheet material 80 are guided during unrolling and rolling action along the legs 76 by means of cable assemblies 102. The hollow legs 76 form guide tracks or guideways, each of which includes a length of the flexible cable 98, first passed several turns around the drive pulley 96 on the roller 82 and then passed around or entrained around an idler pulley 104 positioned adjacent an outer or free end of the leg 76. Each idler pulley 104 is supported on a slidable guide or base 106 having a pair of slots 106a and 106b defined in opposite end portions thereof along a longitudinal axis. The slidable guides 106 are supported on a pair of fixed pins 108 having retaining heads thereon and extending outwardly from the outer walls of the legs 76. The outermost pins 108 are also utilized to support the outer end of a bias spring 110 having an inner end loop connected to a pin 112 mounted on the slidable guide or base 106 between the slots 106a and 106b.

In accordance with the present invention, as the sheet material 80 unwinds from the roller 82, the mean diameter of the material on the roller decreases slightly and the bias springs 110 are effective to decrease the center spacing between the roller 82 and the idler pulley 104 to take up the slack as the sheet material unrolls. A slight decrease in center to center distance occurs during unrolling action because the drive pulleys 96 are longer in diameter than the mean diameter of the roller 82 and material 80. Thus, tension is continuously maintained on the sheet material 80 to provide a taut planar sheet of light-modifying material for interacting with light moving from the light source 14 downwardly to the image and copy sheets between the vacuum blanket 34 and transparent plate 40 in the glass frame 38.

The electric drive motor 90 is mounted in coaxial alignment with the center of the roller 82, and no offcenter or eccentric torque to the yoke is applied because of the weight of the motor. The motor and gear box 90 are supported in cantilever fashion from the end wall of the bight 74 through the base 92 and thus reactive torque from operation of the motor is transferred directly to the yoke 70 about the longitudinal central axis of the roller 82. Limit switches 114 and 116 are provided at opposite ends of one of the guide legs 76 for stopping engagement with an outer end portion of the lead rod 100 so as to deenergize the electric motor 90 when the sheet material 80 reaches a rolled-up condition or position (FIG. 5) or an unrolled condition shown in FIG. 6, respectively.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Apparatus for changing the character of light energy flowing from a light source toward a generally planar sheet of light sensitive copy, comprising:
   a roll enclosure housing mounted adjacent one edge and outside of said copy sheet;
   a roll of thin, flexible, light-modifying sheet material rotatably mounted in said housing for rolling and unrolling on a roller between a first, light-intercepting unrolled position extending out of said housing generally parallel of said planar copy sheet spaced in an area between said light source and said copy sheet and a second, rolled-up position contained in said housing outside of said area;
   guide means extending outwardly of said housing along opposite edges of said copy sheet normal to said one edge including means for guiding a leading edge of said roll of sheet material toward an edge of said copy sheet opposite said one edge thereof; and
   motor means in said roller for rolling and unrolling said sheet material to move the same between said first and second positions.

2. The apparatus of claim 1 wherein:
   said motor means includes a rotor internally engaging said roller to drive the same in reversible directions to roll and unroll said sheet material between said first and second positions, and a stator secured against rotation relative to said housing.

3. The apparatus of claim 2, wherein:
   said stator and rotor are in coaxial alignment with said roller adjacent an end portion thereof.

4. The apparatus of claim 3, including:
   bearing means adjacent an opposite end portion of said roller mounted on said housing for supporting rotation of said roller relative thereto.

5. The apparatus of claim 1, wherein:
   said guide means includes rigid rod means engaged with said leading edge of said sheet material parallel of said roller for exerting tension on said sheet material between said rod means and said roller.

6. The apparatus of claim 5, wherein:
said guide means includes a pair of guide housings extending normal to said roll housing and defining a path for movement of opposite end portions of said rod means toward and away from said roll housing as said sheet material is rolled and unrolled from said roller.

7. The apparatus of claim 6, wherein:
said guide means includes a pair of flexible cables mounted in respective ones of said guide housings and secured to opposite end portions of said rod means for moving the same toward and away from said roller.

8. The apparatus of claim 7, wherein:
said guide means includes an idler pulley mounted adjacent an outer end portion of said guide housing and a drive pulley mounted adjacent said roller for each of said flexible cables; and
biasing means for each of said idler pulleys biasing the same away from a respective drive pulley to maintain tension on said flexible sheet material during rolling and unrolling from said roller.

9. The apparatus of claim 8, wherein:
said guide means includes a base supporting an idler pulley mounted for slidable movement on each of said guide housings for movement toward and away from said roll housing and spring means for biasing said base away from said roll housing for maintaining tension on said flexible sheet material.

10. The apparatus of claim 1, wherein said thin flexible sheet comprises a roll of plastic film of a type chosen for the purpose of diffusing, filtering or attenuating the light from said light source passing through said film.

11. Apparatus for changing the character of light energy flowing from a light source toward a generally planar sheet of light sensitive copy, comprising:
yoke means including a bight mounted adjacent one edge and outside of said copy sheet and a pair of legs extending normally outwardly from opposite ends of said bight along opposite sides of said copy sheet;
a roll of thin, flexible, light-modifying sheet material rotatably mounted parallel of said bight for rolling and unrolling on a roller between a first, light-intercepting unrolled position extending outwardly from said bight between said legs generally parallel of said planar copy sheet spaced in a region spaced between said light source and said copy sheet and a second, rolled-up position offset from said region;
guide means on said legs and rod means connected to said guide means for guiding a leading edge of said roll of sheet material toward an edge of said copy sheet opposite said one edge thereof; and motor means in said roller for rolling and unrolling said sheet material to move the same between said first and second positions.

12. The apparatus of claim 11, wherein:
said yoke comprises a U-shaped member with said bight and legs thereof formed of elongated channels having open sides facing said region, said roll of sheet material on said roller being mounted in said bight and said guide means mounted in said respective legs in communication therewith.

13. The apparatus of claim 12, wherein:
said rod means extends between said legs in parallel with said bight.

14. The apparatus of claim 12, wherein:
said guide means includes an assembly in each of said legs comprising a flexible cable having one end connected to said rod means and entrained around an idler pulley adjacent an outer end of a leg and having an opposite end connected to a drive pulley on said roller.

15. The apparatus of claim 14, wherein:
each of said assemblies includes means for maintaining said cable and said sheet material under tension.

16. The apparatus of claim 15, wherein:
said tension means include a slide on each of said legs supporting said idler pulley thereon biased outwardly away from said roller.

17. The apparatus of claim 11, wherein:
said thin flexible sheet material comprises a plastic film having a frosted surface for diffusing light passing through said film from said light source to said copy.

18. The apparatus of claim 17, wherein:
said frosted surface comprises peaks and valleys facing said light source and said sheet material has a smooth opposite surface facing said copy.

19. The apparatus of claim 11, including:
glass frame means having a rigid sheet of transparent material for supporting said copy in spaced parallel relation with said thin flexible sheet in said first position on a side facing away from said light source; and
vacuum blanket means for holding said copy against said rigid sheet for exposure to light passing through said thin flexible sheets.

20. The apparatus of claim 19, wherein:
said thin flexible sheet comprises a plastic film having a frosted surface for diffusing light from said light source passing through said film toward said copy.

21. The apparatus of claim 19, wherein:
said thin flexible sheet comprises a plastic film for attenuating the light from said source passing through said film toward said copy.

22. The apparatus of claim 19, wherein:
said thin plastic sheet comprises a plastic film for filtering to provide a selected spectrum of light to be passed through the film from said light source toward said copy.

* * * * *